United States Patent [19]

Edlin

[11] Patent Number: 4,595,287
[45] Date of Patent: Jun. 17, 1986

[54] DOPPLER EFFECT LASER VELOCITY MEASURING SYSTEM

[75] Inventor: George R. Edlin, Huntsville, Ala.

[73] Assignee: The United States of America as represented by the Secretary of the Army, Washington, D.C.

[21] Appl. No.: 571,766

[22] Filed: Jan. 18, 1984

[51] Int. Cl.$^4$ .................. G01P 3/36; G01B 11/26; G01B 11/00

[52] U.S. Cl. .................. 356/28.5; 356/152; 356/363

[58] Field of Search .............. 356/28.5, 152, 363, 356/356

[56] References Cited

U.S. PATENT DOCUMENTS

| 4,102,572 | 7/1978 | O'Meara | 356/152 X |
| 4,140,398 | 2/1979 | Hodder | 356/152 |
| 4,168,908 | 9/1979 | Cubalchini | 356/152 |
| 4,355,898 | 10/1982 | Dakin | 356/346 |

OTHER PUBLICATIONS

M. K. Mazumder, *Applied Physics Letters*, 1, Jun. 1970, pp. 462–464.

*Primary Examiner*—Stephen C. Buczinski
*Assistant Examiner*—Linda J. Wallace
*Attorney, Agent, or Firm*—John H. Raubitschek; Werten F. W. Bellamy; Robert C. Sims

[57] ABSTRACT

The frequency shift of reflected laser beam from a target is transformed into an angular measurement which is proportional to the velocity of the target relative to the measurement platform. The system uses the refraction angle of the reflected beam from a movable optical grating to produce the angular measurement.

5 Claims, 1 Drawing Figure

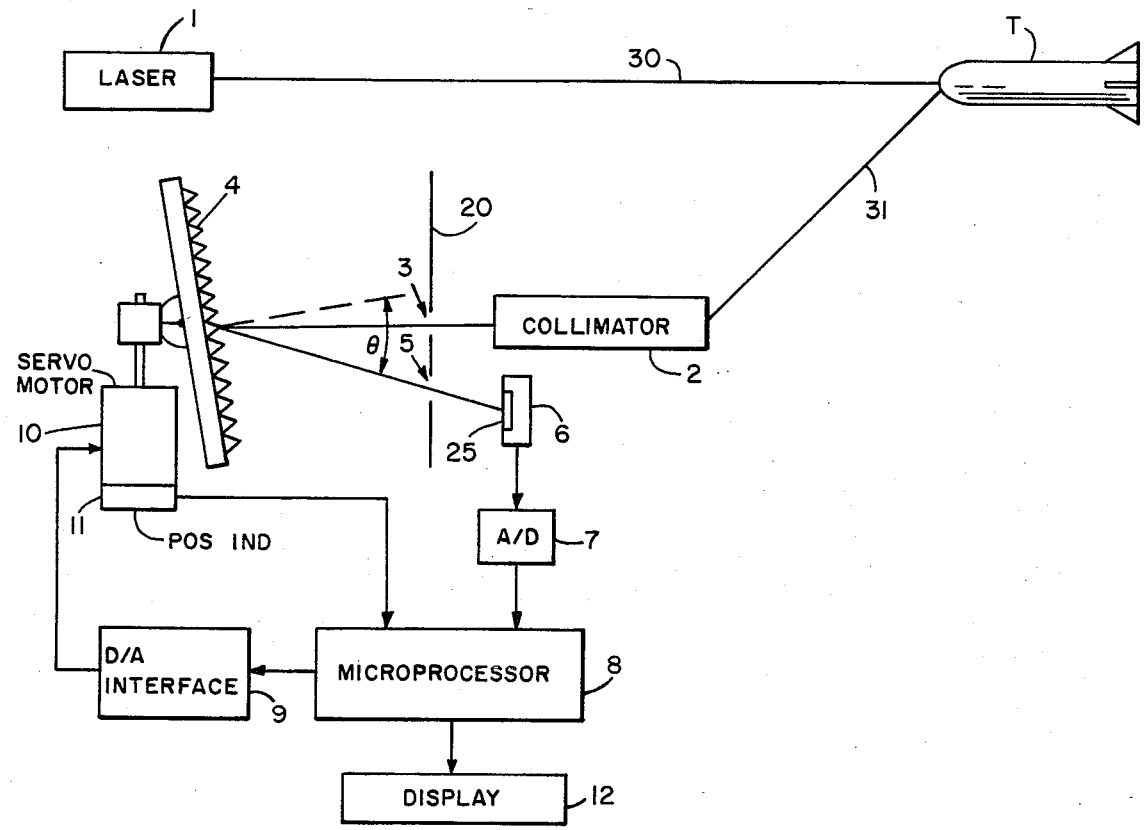

DOPPLER EFFECT LASER VELOCITY MEASURING SYSTEM

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

It is desired to rapidly determine the velocity of high speed reentry vehicles (RV's). The current systems require a tracking of the RV to compute the speed or lapsed time measurement from a pulsed LASER system. Both these systems must have uninterrupted line of site contact with the RV during the measurement sequence. An obscured pulse in the time measurement system would result in the considerable error in the computed velocity or no reading at all. For the system presented in this disclosure, accuracy is not affected by momentary drop out in the signal being processed. This system can measure very high velocities with a minimum of time on the target vehicle. It will quickly give the velocity of either an incoming or outgoing target (with respect to the observation platform).

BRIEF DESCRIPTION OF THE DRAWING

The single FIGURE is a diagrammatic showing of the preferred embodiment of the present invention.

DESCRIPTION OF THE PREFERRED EMBODIMENT

The beam 30 from a conventional cw LASER 1 as shown in the FIGURE is directed at the high velocity target T. The reflected doppler shifted energy 31 from the target is incident on the collimator 2 which focuses and collimates the energy on the entrance slit 3 in plate 20. The shifted monochromatic energy then is refracted by the grating 4. The refraction angle $\theta$ of the monochromatic energy from the grating is given by equation 1:

$$\sin \theta = mk(\lambda/d) \quad (1)$$

where
m—1, 2, 3 . . . Integers
k—constant
$\lambda$—wavelength
d—separation of lines on grating It is obvious from equation 1 that a change in the wavelength $\lambda$ of laser 1 (which is denoted $\Delta\lambda$) will give rise to a $\Delta\theta$ which is proportional to $\Delta\lambda$). The doppler shift is given by equation 2:

$$\lambda_{ds} = (C + Vs)/f_s \quad (2)$$

where
$\lambda_{ds}$—The doppler shifted wavelength
c—The velocity of light
$f_s$—The frequency of the LASER
$V_s$—The relative velocity of target to system
Then $\Delta\lambda$ is obtained by taking the difference between $\lambda$ the original LASER frequency and $\lambda_{ds}$ the wavelength of the doppler shifted reflection. The technique utilized is to measure $\Delta\theta$ which is proportional to $\Delta\lambda$ and can be correlated with the speed of the target vehicle ($V_s$).

The refracted doppler shifted energy then will be made to incident on be the exit slit plane 5, and will be sampled by detector 6. Maximum energy passes through the exit slit 5 if the angle of the grating is correct. If not, the servo system consisting of the A/D converter 7, microprocessor 8, D/A interface 9, drive motor 10, and position indicator 11 serves to maximize the signal output of the detector 6 by incrementally driving the drive motor 10 to the point of maximum output in a manner well known in the art. The position indicator 11 is then read and thus $\theta$ is determined. This value is compared with a look up table stored in the microprocessor 8 and the velocity is passed to the output device 12 in any type velocity units desired. Any of the well known microprocessors such as the Hewlett Packard 2108K processor can be programed to perform the desired functions. Detector 6 can be any well known detector such as a combination of an electromagnetic sensitivie diode 25 connected to an amplifier.

The system has some important advantages over conventional doppler radar systems. The beam size is much smaller and is able to illuminate targets that are closely spaced. The antennas of radar systems must be very large to have beam width of a few degrees. The grating utilized is a passive device, which is the heart of the system. This implies simplicity and less susceptibility to electromagnetic and nuclear environments. The system is optically coupled to the outside world. This allows the system to be completely shielded from electromagnetic interference, with only one small aperture that could couple to the outside environment. The system can also be used to detect the frequency of the incoming beam 31 by changing the data in the look up table of processor 8, as it matters not what frequency the target is illuminated with if one only wants to know the frequency of beam 31.

I claim:

1. A measuring system comprising a laser generating means for directing first electromagnetic energy at a first frequency towards a moving target in space; said target moving relative to the measuring system; reflected second electromagnetic energy from said target; an optical grating; a first device for collecting said second reflected electromagnetic energy and directing it towards said optical grating; an electromagnetic detector located spatially from said grating so as to receive electromagnetic energy refracted from said grating; positioning means attached to said grating so as to move said grating to an angle such that maximum electromagnetic energy is directed to said detector; and indicator means connected to said positioning means for measuring the position of said grating; and measurement means responsive to the position of said grating for producing an output proportional to the change in frequency of the reflected energy caused by doppler shift from said target.

2. A system as set forth in claim 1 further comprising a plate having a small orifice therein positioned between said grating and said detector so that only electromagnetic energy passing through said orifice will reach said detector.

3. A system as set forth in claim 2 further comprising a servo system connected between an output of said detector and said positioning means for driving said grating to a position whereby said detector will have a maximum output.

4. A system as set forth in claim 3 wherein said first device is an electromagnetic collimator for collecting reflected electromagnetic energy and directing the energy toward said grating at a constant angle.

5. A measuring system comprising an optical grating; a first device for collecting incoming electromagnetic energy and directing it towards said optical grating; an electromagnetic detector located spatially from said grating so as to receive electromagnetic energy refracted from said grating; positioning means attached to said grating so as to move said grating to an angle such that maximum electromagnetic energy is directed to said detector; indicator means connected to said positioning means for measuring the position of said grating; a plate having a small orifice therein positioned between said grating and said detector so that only electromagnetic energy passing through said orifice will reach said detector; a servo system connected between an output of said detector and said positioning means for driving said grating to a position whereby said detector will have a maximum output; said first device being an electromagnetic collimator for collecting incoming electromagnetic energy and directing the energy toward said grating at a constant angle; a laser generating means for directing electromagnetic energy at a first frequency towards a moving target in space; said target moving relative to the measuring system; reflected electromagnetic energy from said target being collected by said collimator; and measurement means responsive to the position of said grating for producing an output proportional to the change in frequency caused by doppler shift from said target.

* * * * *